US012670089B2

(12) United States Patent
Andress et al.

(10) Patent No.: US 12,670,089 B2
(45) Date of Patent: Jun. 30, 2026

(54) METHOD AND SYSTEM FOR TESTING FUNCTIONALITY OF A SOFTWARE PROGRAM USING DIGITAL TWIN

(71) Applicant: Siemens Medical Solutions USA, Inc., Malvern, PA (US)

(72) Inventors: Keith Andress, Oak Ridge, TN (US); Saurav Daga, Bangalore (IN); Murali Tharan Gnanamani, Bangalore (IN); Tasheer Hussain B, Bengaluru (IN); Sandesh Naik, Uttara kannada (IN)

(73) Assignee: Siemens Medical Solutions USA, Inc., Malvern, PA (US)

( * ) Notice: Subject to any disclaimer, the term of this patent is extended or adjusted under 35 U.S.C. 154(b) by 327 days.

(21) Appl. No.: 18/683,451

(22) PCT Filed: Aug. 30, 2021

(86) PCT No.: PCT/US2021/048176
§ 371 (c)(1),
(2) Date: Feb. 13, 2024

(87) PCT Pub. No.: WO2023/033782
PCT Pub. Date: Mar. 9, 2023

(65) Prior Publication Data
US 2024/0354242 A1      Oct. 24, 2024

(51) Int. Cl.
*G06F 11/3668* (2025.01)
*G06F 11/3698* (2025.01)

(52) U.S. Cl.
CPC ...... *G06F 11/3692* (2013.01); *G06F 11/3688* (2013.01); *G06F 11/3698* (2025.01)

(58) Field of Classification Search
None
See application file for complete search history.

(56) References Cited

U.S. PATENT DOCUMENTS 7,536,678 B2      5/2009   Kothari et al.
8,276,123 B1 *    9/2012   Deng .................... G06F 11/368
                                                      717/124
8,584,100 B2      11/2013  Xu et al.
(Continued)

OTHER PUBLICATIONS

International Search Report & Written Opinion for PCT/US21/48176 mailed Nov. 23, 2021.

*Primary Examiner* — Qing Chen
(74) *Attorney, Agent, or Firm* — Lempia Summerfield Katz LLC

(57) ABSTRACT

A method and system are disclosed for testing functionality of a software program based on at least one modification to a software code of the software program. In one embodiment, the method includes: receiving software code of software program from one or more sources; identifying functions within the software code of the software program affected by the modification of software code; simulating the identified functions of the software program using digital twin; determining workflows of the software program based on the simulation of digital twin; identifying at least one impacted workflow from determined workflows based on one or more requirements of software program; and executing at least one impacted workflow critical to the functionality of the software program for testing the functionality of software program.

16 Claims, 14 Drawing Sheets

(56)                    References Cited

U.S. PATENT DOCUMENTS

2013/0024837  A1      1/2013   Bienkowski
2013/0042224  A1      2/2013   Kerizac
2014/0282400  A1      9/2014   Moorthi
2021/0165731  A1*     6/2021   Ross  ..................... G06F 21/577
2022/0163953  A1*     5/2022   Lutz  ................ G05B 19/41885
2022/0197781  A1*     6/2022   Mohamed El Amine ..................
                                                     G06F 11/3688

* cited by examiner

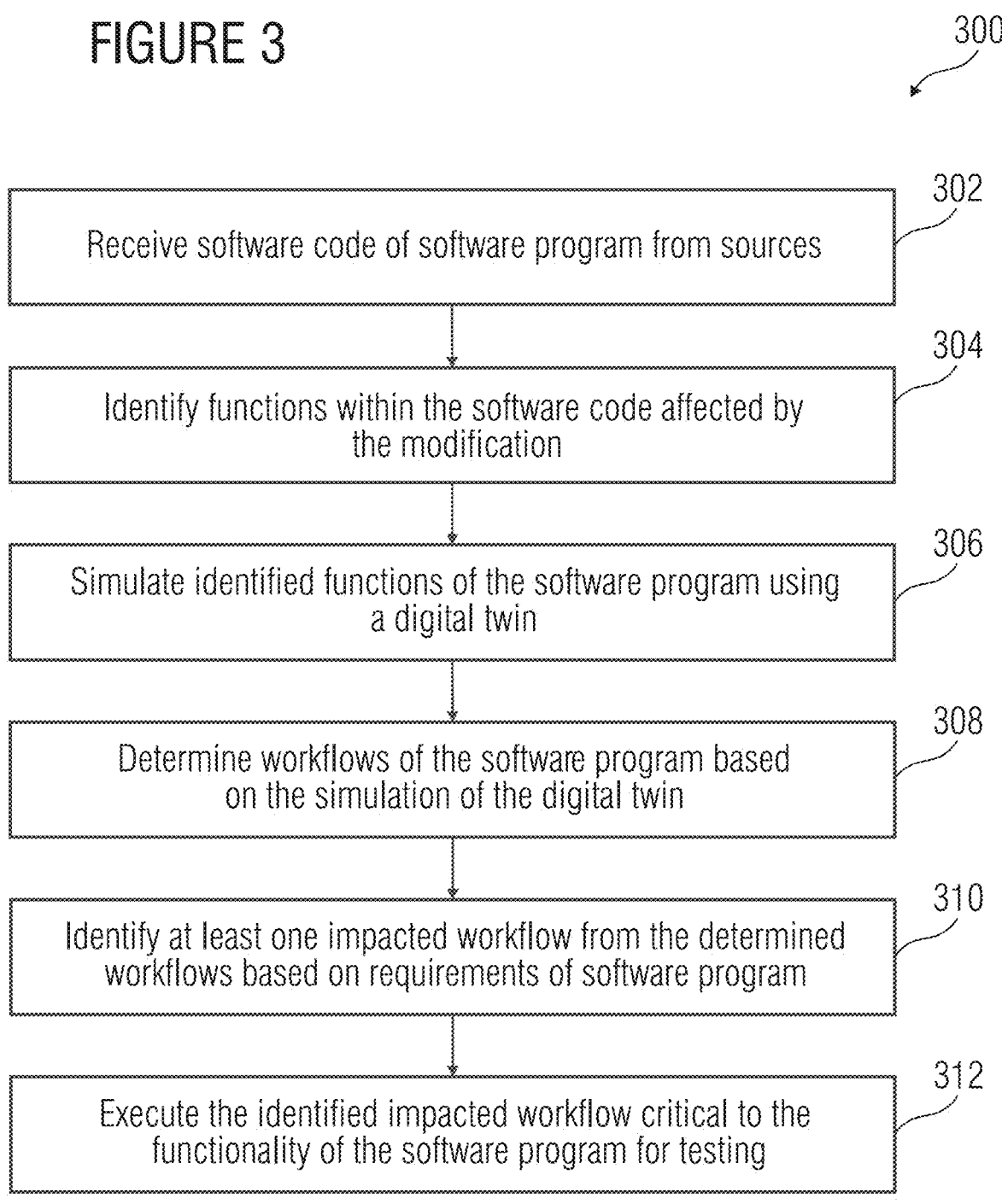

300

302

Receive software code of software program from sources

304

Identify functions within the software code affected by the modification

306

Simulate identified functions of the software program using a digital twin

308

Determine workflows of the software program based on the simulation of the digital twin

310

Identify at least one impacted workflow from the determined workflows based on requirements of software program

312

Execute the identified impacted workflow critical to the functionality of the software program for testing

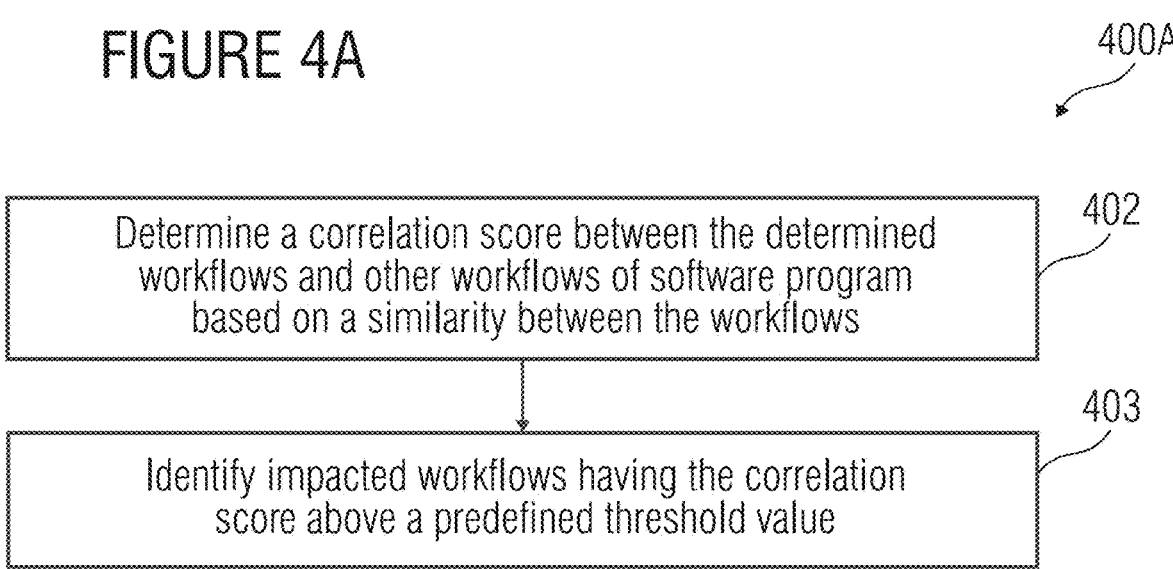

Determine a correlation score between the determined workflows and other workflows of software program based on a similarity between the workflows

402

Identify impacted workflows having the correlation score above a predefined threshold value

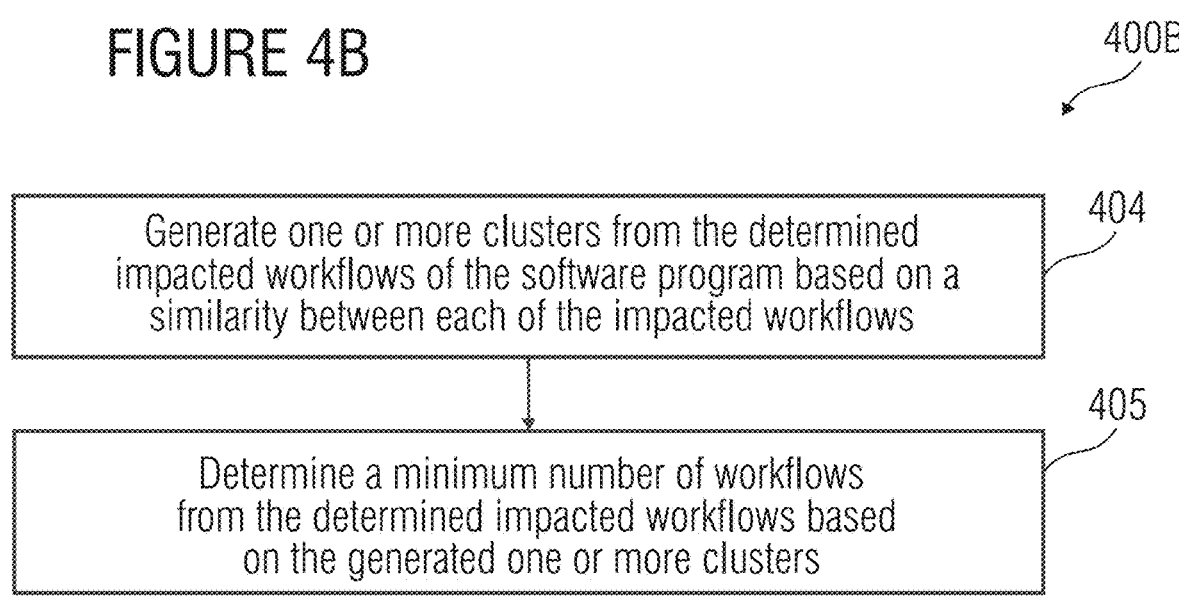

Generate one or more clusters from the determined impacted workflows of the software program based on a similarity between each of the impacted workflows

404

Determine a minimum number of workflows from the determined impacted workflows based on the generated one or more clusters

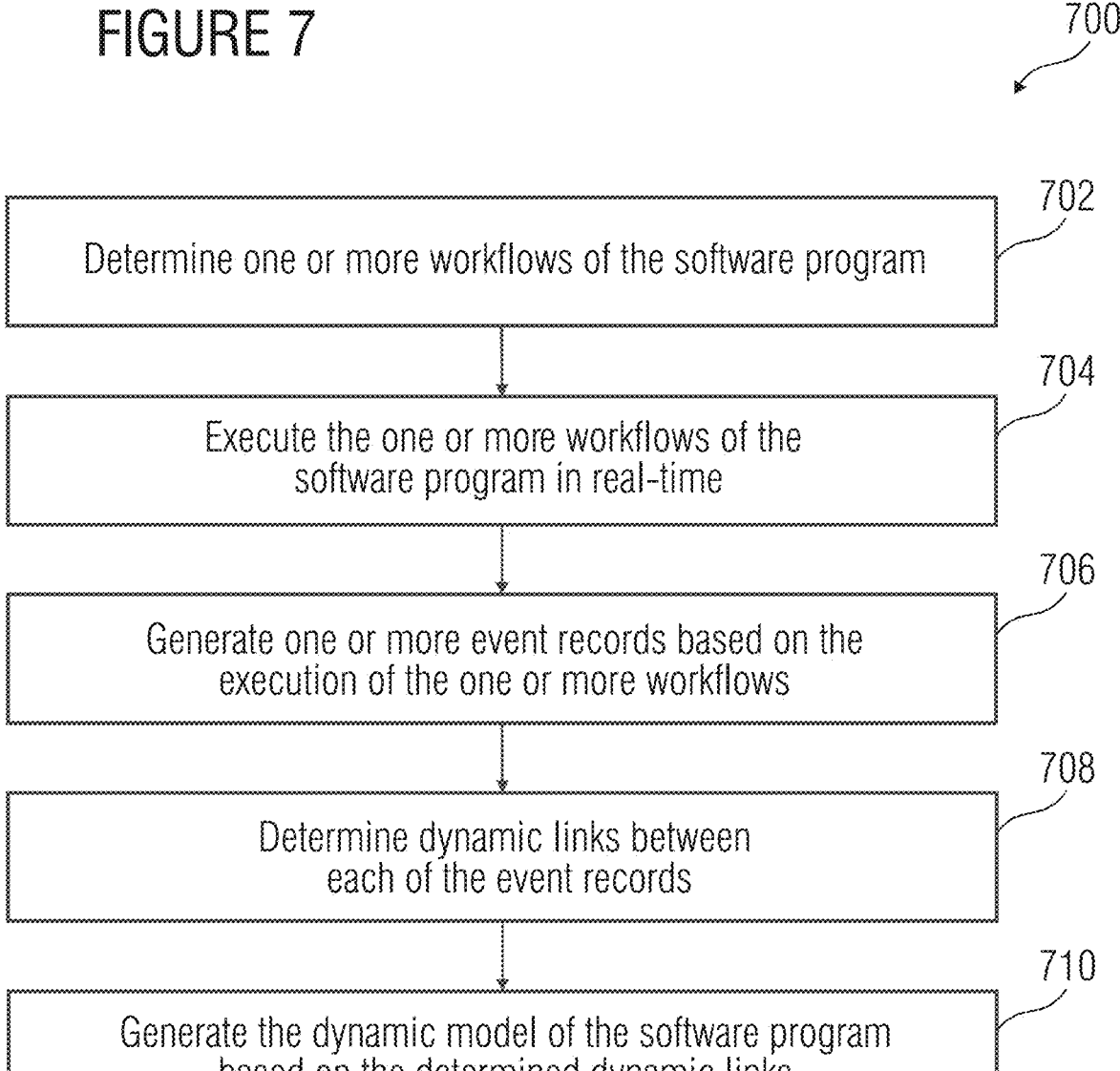

702

Determine one or more workflows of the software program

704

Execute the one or more workflows of the
software program in real-time

706

Generate one or more event records based on the
execution of the one or more workflows

708

Determine dynamic links between
each of the event records

710

Generate the dynamic model of the software program
based on the determined dynamic links

800

802

Compare a previous version of the software code
with the received software code

804

Identify the one or more functions within the software code
of the software program based on the comparison

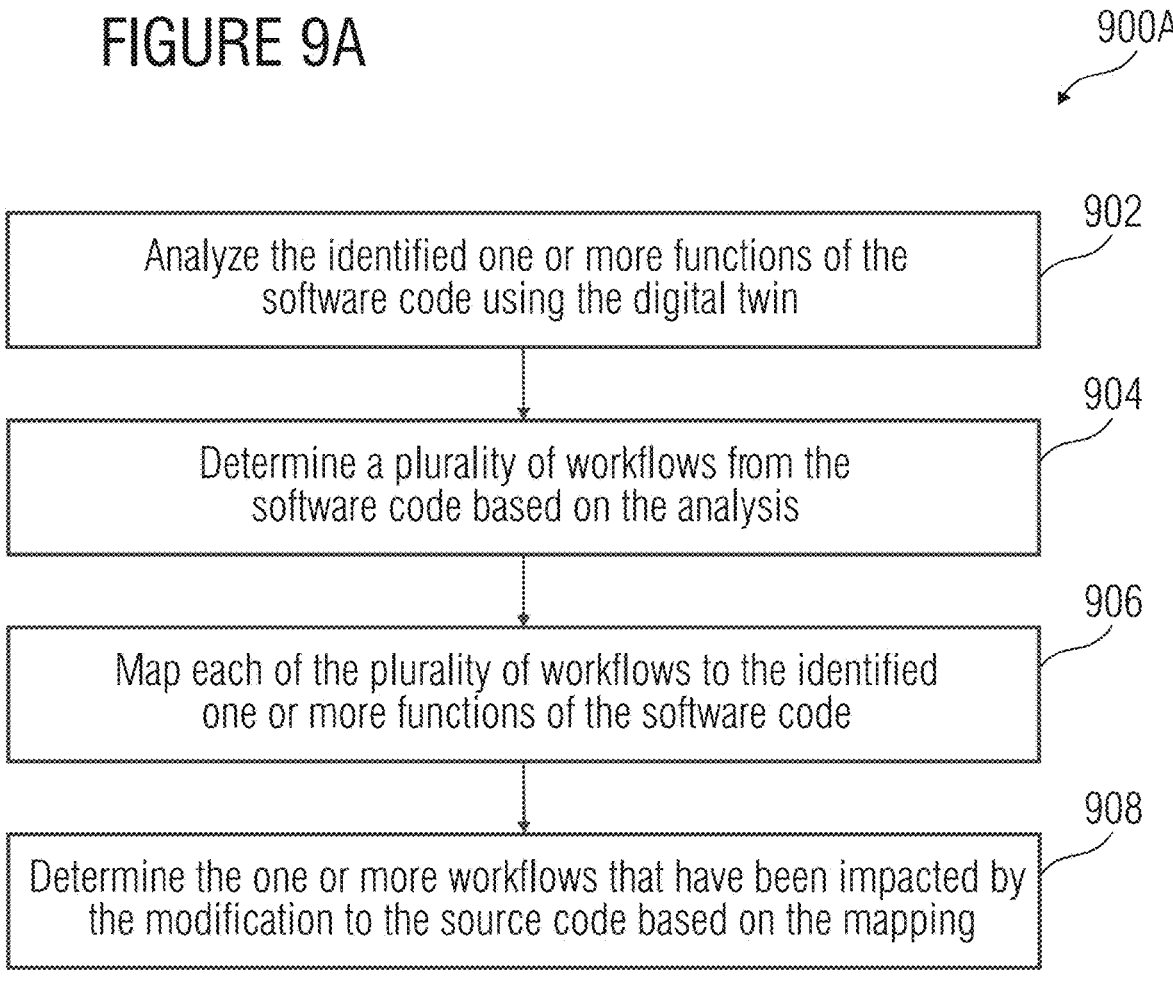

902

Analyze the identified one or more functions of the
software code using the digital twin

904

Determine a plurality of workflows from the
software code based on the analysis

906

Map each of the plurality of workflows to the identified
one or more functions of the software code

908

Determine the one or more workflows that have been impacted by
the modification to the source code based on the mapping

METHOD AND SYSTEM FOR TESTING FUNCTIONALITY OF A SOFTWARE PROGRAM USING DIGITAL TWIN

The present patent document is a § 371 nationalization of PCT Application Serial No. PCT/US2021/048176, filed Aug. 30, 2021, designating the United States, which is incorporated by reference in its entirety.

FIELD OF TECHNOLOGY

The present disclosure relates to the field of testing a computer program and more particularly to the field of testing functionality of a software program based on modifications to a software code of the software program using digital twin.

BACKGROUND

Testing of a computer program is frequently performed during software development to verify the computer program is functioning properly subsequent to a change made to software code of the computer program. However, when a change is made to the software code of the computer program, the functionality of the computer program may not be thoroughly tested prior to release to consumers. Software programs, especially in medical scanners, follow a multi-layered architecture. In an example, the medical software programs may include firmware, Operating System (Windows software), CT Software, and MI (PET/SPECT) Software. A software change in one area may have impact on a part of the system or the entire system.

Due to the inherent complex nature of the software and the device, it is humanly impossible to accurately assess the impact of a software change on the entire system. The functionality of the software program may not thoroughly be tested because the person testing the program code lacks a complete understanding of the change made to the program code. Therefore, without a complete understanding of the change made to the program code, the person may not know all the parts of the computer program that are affected by the change and that need to be tested. Moreover, the computer program may be very complex, and as the complexity of the computer program increases even a seemingly minor change to the program code may have a large impact on functionality of the computer program.

Existing approaches for testing functionality of a computer program affected by a program code change may be extremely time consuming and susceptible to increased human error. Currently experts assess these complex interactions based on limited scope or primarily, their domain knowledge. Hence, the exiting methodologies are highly inaccurate and error prone which may lead to untested workflows being released in the market. In medical scenarios, such an error is even more critical and may sometimes lead to an improper diagnosis of a patient due an inadequately tested software program in use.

Furthermore, it is to be understood that aspects of medical software may not change and people who develop the software and who maintain the software in the long run may be different. Hence, the process of manual identification of impacted regression tests for any software change needs to be more robust and demands a data-driven scientific methodology.

Moreover, a software update or a software upgrade needs to be assessed thoroughly before it is released into the markets. It is a need to have a faster time to market due to market competitiveness, manpower and resource constraints. Existing systems do not function on a test strategy with an ability to prioritize and run impacted test cases at an earlier stage in the cycle. Therefore there is a need for a system to improve test quality by prioritizing and running impacted test cases at an earlier stage in the cycle and assist business in delivering a better product with a faster turnaround time.

The object of the disclosure is therefore to provide a method and a system for testing functionality of a software program based on at least one modification to a software code of the software program using a digital twin.

SUMMARY

In one aspect, a method is provided for testing functionality of a software program based on at least one modification to a software code of the software program. The method includes receiving the software code of the software program from one or more sources, wherein the software code has been modified. Further, the method includes identifying one or more functions within the software code of the software program affected by the modification of the software code. The method includes simulating the identified one or more functions of the software program using a digital twin, wherein the digital twin is generated based on a static model and a dynamic model of the software program stored in a database. The method includes determining one or more workflows of the software program based on the simulation of the digital twin, wherein the determined one or more workflows are impacted by the identified one or more functions. The method includes identifying at least one impacted workflow from the one or more determined workflows based on one or more requirements of the software program. Herein the at least one impacted workflow is critical to the functionality of the software program. Further, the method includes executing the identified at least one impacted workflow critical to the functionality of the software program for testing the functionality of the software program.

In another aspect, a device is provided for testing functionality of a software program based on at least one modification to a software code of the software program. The device includes a processing unit and a memory coupled to the processing unit. The memory includes a workflow determination module configured for receiving the software code of the software program from one or more sources, wherein the software code has been modified. Further, the workflow determination module is configured for identifying one or more functions within the software code of the software program affected by the modification of the software code. The workflow determination module is configured for simulating the identified one or more functions of the software program using a digital twin, wherein the digital twin is generated based on a static model and a dynamic model of the software program stored in a database. The workflow determination module is configured for determining one or more workflows of the software program based on the simulation of the digital twin, wherein the determined one or more workflows are impacted by the identified one or more functions. The workflow determination module is configured for identifying at least one impacted workflow from the one or more determined workflows based on one or more requirements of the software program. Herein, the at least one impacted workflow is critical to the functionality of the software program. Further, the workflow determination module is configured for executing the identified at least one impacted workflow critical to the functionality of the software program for testing the functionality of the software program.

In another aspect, a system is provided for testing functionality of a software program based on at least one modification to a software code of the software program. The system includes one or more servers and a device communicatively coupled to the servers. The servers include one or more instructions which when executed cause the server to receive the software code of the software program from one or more sources, wherein the software code has been modified. The instructions further cause the servers to identify one or more functions within the software code of the software program affected by the modification of the software code. Furthermore, the instructions cause the servers to simulate the identified one or more functions of the software program using a digital twin, wherein the digital twin is generated based on a static model and a dynamic model of the software program stored in a database. Furthermore, the instructions cause the servers to determine one or more workflows of the software program based on the simulation of the digital twin, wherein the determined one or more workflows are impacted by the identified one or more functions. Further, the instructions cause the server to identify at least one impacted workflow from the one or more determined workflows based on one or more requirements of the software program. Herein the at least one impacted workflow is critical to the functionality of the software program. Further, the instructions cause the server to execute the identified at least one impacted workflow critical to the functionality of the software program for testing the functionality of the software program.

In yet another aspect, a non-transitory computer-readable storage medium having machine-readable instructions stored therein, that when executed by the server, causes the server to perform the method acts as described above.

This summary is provided to introduce a selection of concepts in a simplified form that are further described below in the following description. It is not intended to identify features or essential features of the claimed subject matter. Furthermore, the claimed subject matter is not limited to implementations that solve any or all disadvantages noted in any part of this disclosure.

BRIEF DESCRIPTION OF THE DRAWINGS

The present disclosure is further described hereinafter with reference to illustrated embodiments shown in the accompanying drawings, in which:

FIG. 3 illustrates a flowchart of a method for testing functionality of a software program based on at least one modification to a software code of the software program, according to an embodiment.

FIG. 4A illustrates a flowchart of a method for identification of additional workflows of the software program, according to an embodiment.

FIG. 4B illustrates a flowchart of a method for determination of minimum number of workflows of the software program, according to an embodiment.

FIG. 7 illustrates a flowchart of a method for generating the dynamic model of the software program, according to an embodiment.

FIG. 9A illustrates a flowchart of a method for determining one or more workflows of the software program based on the simulation of the digital twin, according to an embodiment.

DETAILED DESCRIPTION

Figure 1:
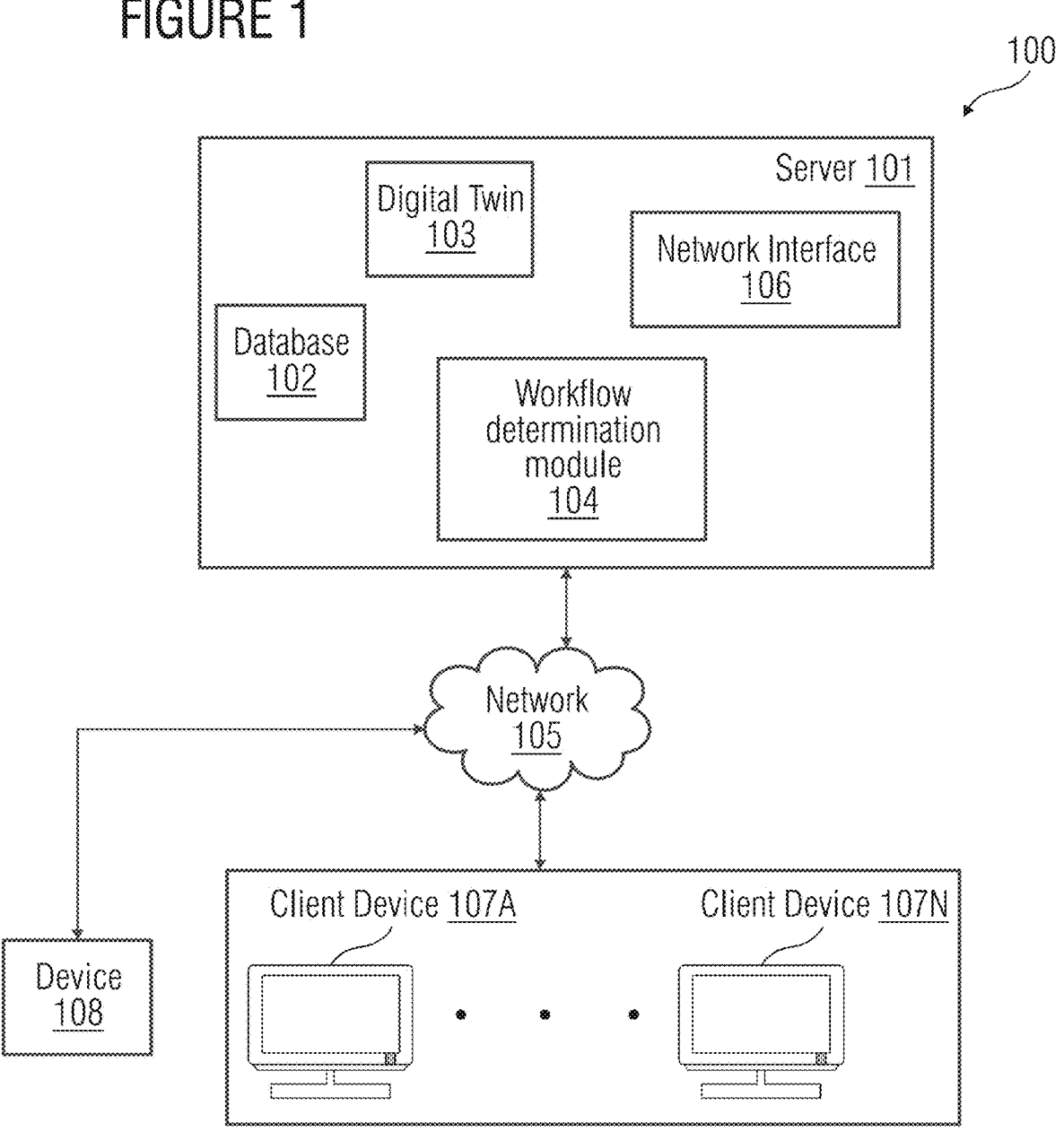
FIG. 1 illustrates a block diagram of a client-server architecture which provides a geometric modeling of components representing different parts of a real-world object, according to an embodiment.

Hereinafter, embodiments for carrying out the present disclosure are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details. In other instances, well known materials or methods have not been described in detail in order to avoid unnecessarily obscuring embodiments of the present disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the present disclosure.

FIG. 1 provides an illustration of a block diagram of a client-server architecture that is a geometric modelling of components representing different parts of real-world objects, according to an embodiment. The client-server architecture 100 includes a server 101 and a plurality of client devices 107A-N. Each of the client device 107A-N is connected to the server 101 via a network 105, for example, local area network (LAN), wide area network (WAN), Wi-Fi, etc. In one embodiment, the server 101 is deployed in a cloud determining environment. As used herein, "cloud determining environment" refers to a processing environment including configurable determining physical and logical resources, for example, networks, servers, storage, applications, services, etc., and data distributed over the network 105, for example, the internet. The cloud determining environment provides on-demand network access to a shared pool of the configurable determining physical and logical resources. The server 101 may include a database 102 that is a repository of information related to modifications to a software code, requirements of the software program, metadata pertaining to digital twin. The server 101 may include a digital twin 103 and testcase determination module 104 that is configured to test functionality of a software program based on at least one modification to a software code of the software program of the device 108. Additionally, the server 101 may include a network interface 106 for communicating with the client device 107A-N via the network 105.

The client device 107A-N are user devices, used by users, for example, a technician, etc. In an embodiment, the user device 107A-N may be used by the user to receive data associated with modifications of the software program of the device 108. The data may be accessed by the user via a graphical user interface of an end user web application on the user device 107A-N. In another embodiment, a request may be sent to the server 101 to access the data associated with the device 108 via the network 105. The device 108 may be connected to the server 101 through the network 105. The device 108 may be a medical imaging unit 108 capable of acquiring a plurality of medical images. The medical imaging unit 108 may be, for example, a scanner unit such as a computed tomography imaging unit, a molecular imaging unit, an X-ray fluoroscopy imaging unit, a magnetic resonance imaging unit, an ultrasound imaging unit, etc. Alternatively, the device 108 may be any equipment or apparatus configured to perform one or more functions as instructed. It will be appreciated that though the embodiments are explained with respect to a medical imaging software, the disclosure is not limited to medical software only. The embodiments of the disclosure may be applied to other software programs and architecture for that need to test functionality of the software program based on at least one modification to a software code of the software program.

Figure 2:
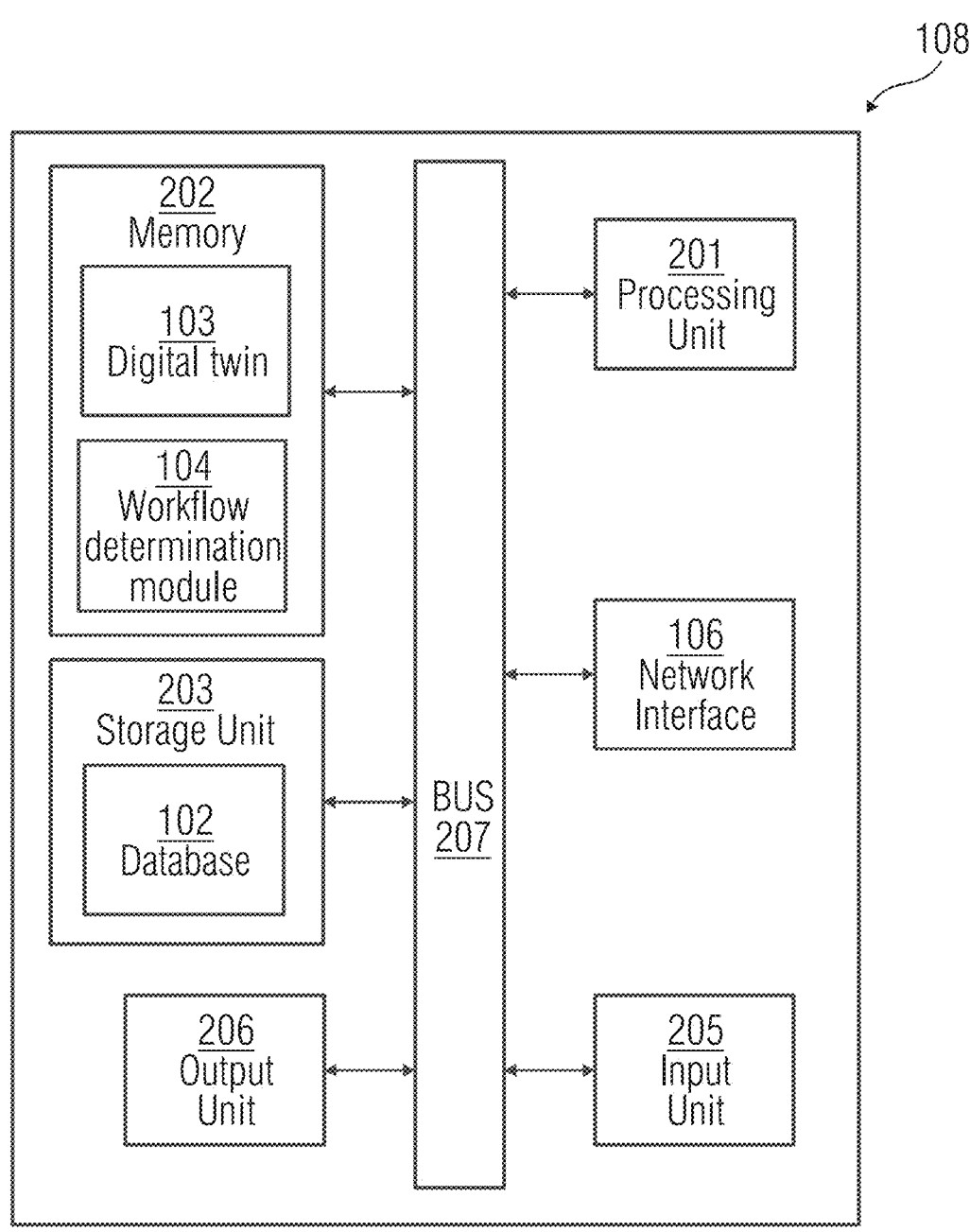
FIG. 2 illustrates a block diagram of a device in which an embodiment of a method for testing functionality of a software program may be implemented.

FIG. 2 is a block diagram of the device 108 in which an embodiment may be implemented, for example, as a device to test functionality of the software program based on at least one modification to a software code of the software program, configured to perform the processes as described therein. In FIG. 2, the device 108 includes a processing unit 201, a memory 202, a storage unit 203, a network interface 104, an input unit 205, an output unit 206 and a standard interface or bus 207.

The processing unit 201, as used herein, means any type of computational circuit, such as, but not limited to, a microprocessor, microcontroller, complex instruction set determining microprocessor, reduced instruction set determining microprocessor, very long instruction word microprocessor, explicitly parallel instruction determining microprocessor, graphics processor, digital signal processor, or any other type of processing circuit. The processing unit 201 may also include embedded controllers, such as generic or programmable logic devices or arrays, application specific integrated circuits, single-chip computers, and the like. The processing unit 201 may include hardware elements and software elements. The processing unit 201 may be configured for multithreading, e.g., the processing unit 201 may host different calculation processes at the same time, executing the either in parallel or switching between active and passive calculation processes.

The memory 202 may be volatile memory and nonvolatile memory. The memory 202 may be coupled for communication with the processing unit 201. The processing unit 201 may execute instructions and/or code stored in the memory 202. A variety of computer-readable storage media may be stored in and accessed from the memory 202. The memory 202 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes a digital twin 103 and a workflow determination module 104 stored in the form of machine-readable instructions on any of the above-mentioned storage media and may be in communication to and executed by processing unit 201. When executed by the processing unit 201, the workflow determination module 103 causes the processing unit 201 to determine a testing functionality of a software program based on at least one modification to a software code of the software program using the digital twin 103. Method acts executed by the processing unit 201 to achieve the above-mentioned functionality are elaborated upon in detail in FIGS. 3, 4, 8, 9, and 10. Furthermore, the generation of the digital twin is elaborated in detail in FIGS. 5,6 and 7.

The storage unit 203 may be a non-transitory storage medium which stores a database 102. The database 102 is a repository of repository of information related to modifications to a software code of the device 108, requirements of the software program, or metadata pertaining to the digital twin 103. The input unit 205 may include input devices or mechanisms such as a keypad, touch-sensitive display, camera (such as a camera receiving gesture-based inputs), etc. capable of receiving an input signal. The bus 207 acts as interconnect between the processing unit 201, the memory 202, the storage unit 203, the network interface 105, the input unit 205, and the output unit 206.

Those of ordinary skilled in the art will appreciate that the hardware depicted in FIG. 2 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, or input/output (I/O) adapter also may be used in addition or in place of the hardware depicted. The depicted example is provided for the purpose of explanation only and is not meant to imply architectural limitations with respect to the present disclosure.

A device in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Washington may be employed if suitably modified. The operating system is modified or created in accordance with the present disclosure as described.

Disclosed embodiments provide systems and methods for analysing event records. In particular, the systems and methods may determine a root cause associated with an anomalous event.

FIG. 3 illustrates a flowchart of a method 300 for testing functionality of a software program based on at least one modification to a software code of the software program, according to an embodiment. At act 302, the software code of the software program is received from one or more sources. The term "one or more sources" refers to one or more devices that provide the software code for testing. In one example, the one or more sources may be the client devices 107A-N wherein the modifications to the software program are performed by a user. In another example, the one or more sources may be a data repository, such as the database 102 wherein the modifications to the software code are stored. The one or more sources are in communication with processing unit 201. In an embodiment, the processing unit 201 includes a software code retrieval module to receive the software code from the one or more sources. The software code is received by the processing unit 201 from the one or more sources. The software code, which has been modified from a previous version, is received for testing the functionality of the software program.

At act 304, one or more functions are identified within the software code of the software program affected by the modification of the software code. The one or more functions may be a list of methods that have been modified in the software code. When modifications or upgrades are made to the software code, it is possible that only some parts of the software code are modified. Hence, the one or more functions of the software code that have been modified are identified with respect to a previous version of the software code. In an embodiment, the processing unit 201 includes a software change identifier module to identify one or more changes within the software code. The method of identification of one or more functions within the software code is further explained in FIG. 8.

At act 306, the more or more function identified in act 304 are simulated using the digital twin 103. The digital twin 103 is generated based on a static model and a dynamic model of the software program stored in a database 102. In accordance with an embodiment, a behavior of the one or more functions is simulated using the digital twin 103 by generating a simulation instance in a simulation environment. The simulation instance may be a thread of simulation, associated with the simulation model, independent of all other threads during execution. Further, the simulation instance is executed in the simulation environment using a simulation model for generating simulation results indicative of a behavior or functionality of the one or more functions. The simulation model may be an analytical model in machine-executable form derived from at least one of a data-driven model or a hybrid model associated with the device 108. The simulation instance may be executed in the simulation environment as one of stochastic simulations, deterministic simulations, dynamic simulations, continuous simulations, discrete simulations, local simulations, distributed simulations, co-simulations, or a combination thereof. The simulation models referred to in the present disclosure may include both system-level models and component-level models associated with the software program of the device 108. The generation of the digital twin 103, static model, and dynamic model are explained in greater detail in FIGS. 5, 6 and 7.

At act 308, one or more workflows of the software program based on the simulation of the digital twin 103 are determined. Herein, the determined one or more workflows are impacted by the identified one or more functions. In other words, the method determines one or more impacted workflows based on the results of the simulation. The impacted workflows are the workflows that are directly impacted by the modifications to the software program. In an embodiment, the processing unit 201 includes an impact assessment module to determine one or more impacted workflows. The determination of impacted workflows is explained in greater detail in FIG. 9.

At act 310, at least one impacted workflow is identified from the one or more determined workflows based on one or more requirements of the software program. Herein the at least one impacted workflow is critical to the functionality of the software program. In other words, at this act the method identifies at least one impacted workflow that is critically impacted by the modifications to the software program. It is to be appreciated that the criticality of the workflows is determined based on the requirements of the software program. In an embodiment, the requirements include a description of features and functionalities of the of the software program of pertaining to the device 108. In an example, the requirements convey the expectations of users from the device 108 in which the software program is implemented. In an example, the processing unit 201 includes a requirement mapper module to map the requirements of the software program to the impacted workflows and determine critical workflows in the software code. The method of identification of at least one impacted workflow from the one or more determined workflows based on one or more requirements of the software program is explained in greater detail in FIG. 10.

Figure 10:
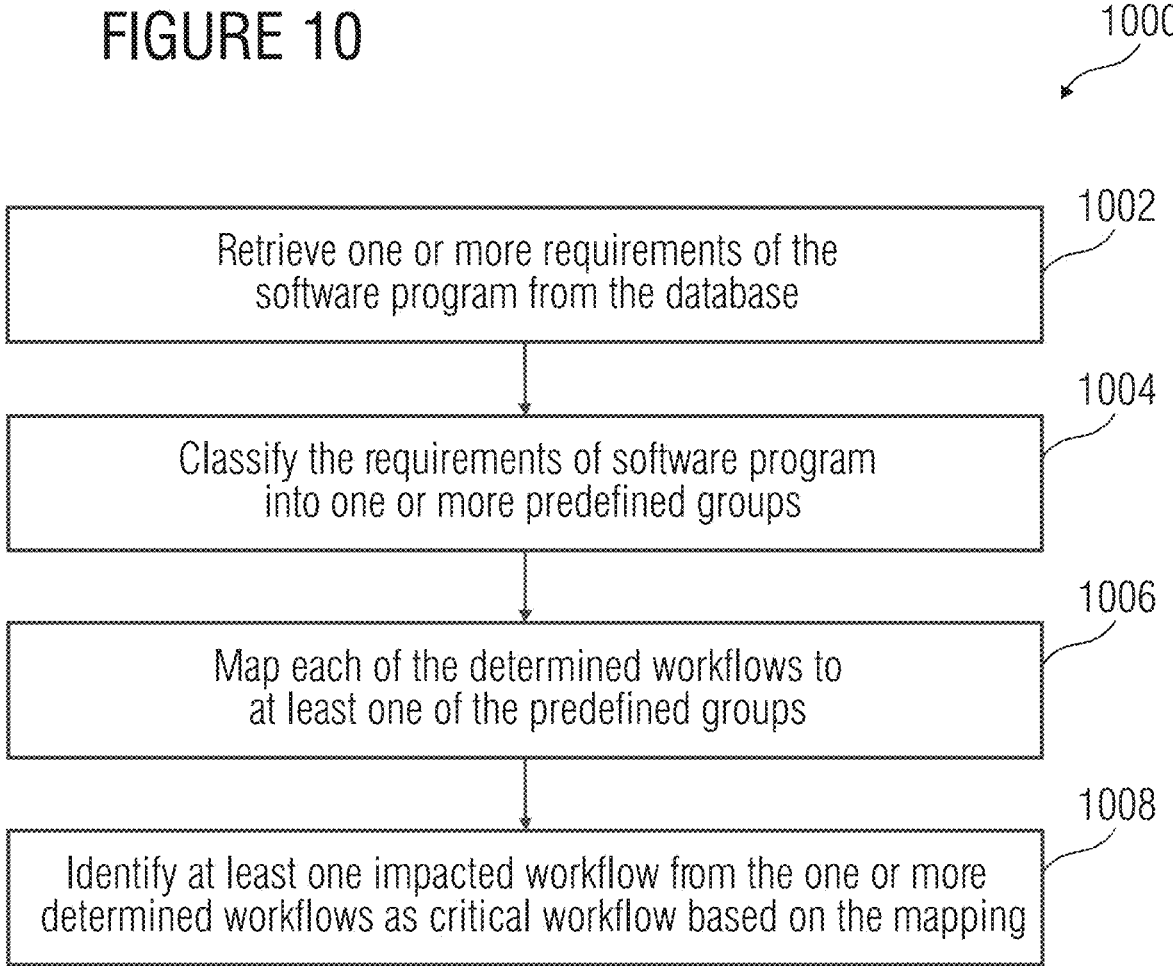
FIG. 10 illustrates a flowchart of a method for identifying at least one impacted workflow from the one or more determined workflows based on one or more requirements of the software program, according to an embodiment.

According to an embodiment, the method further includes determining additional impacted workflows that are substantially similar to the at least one impacted workflow as determined above (or in detail in FIG. 10). The method is explained in greater detail in FIG. 4A.

Figure 4C:
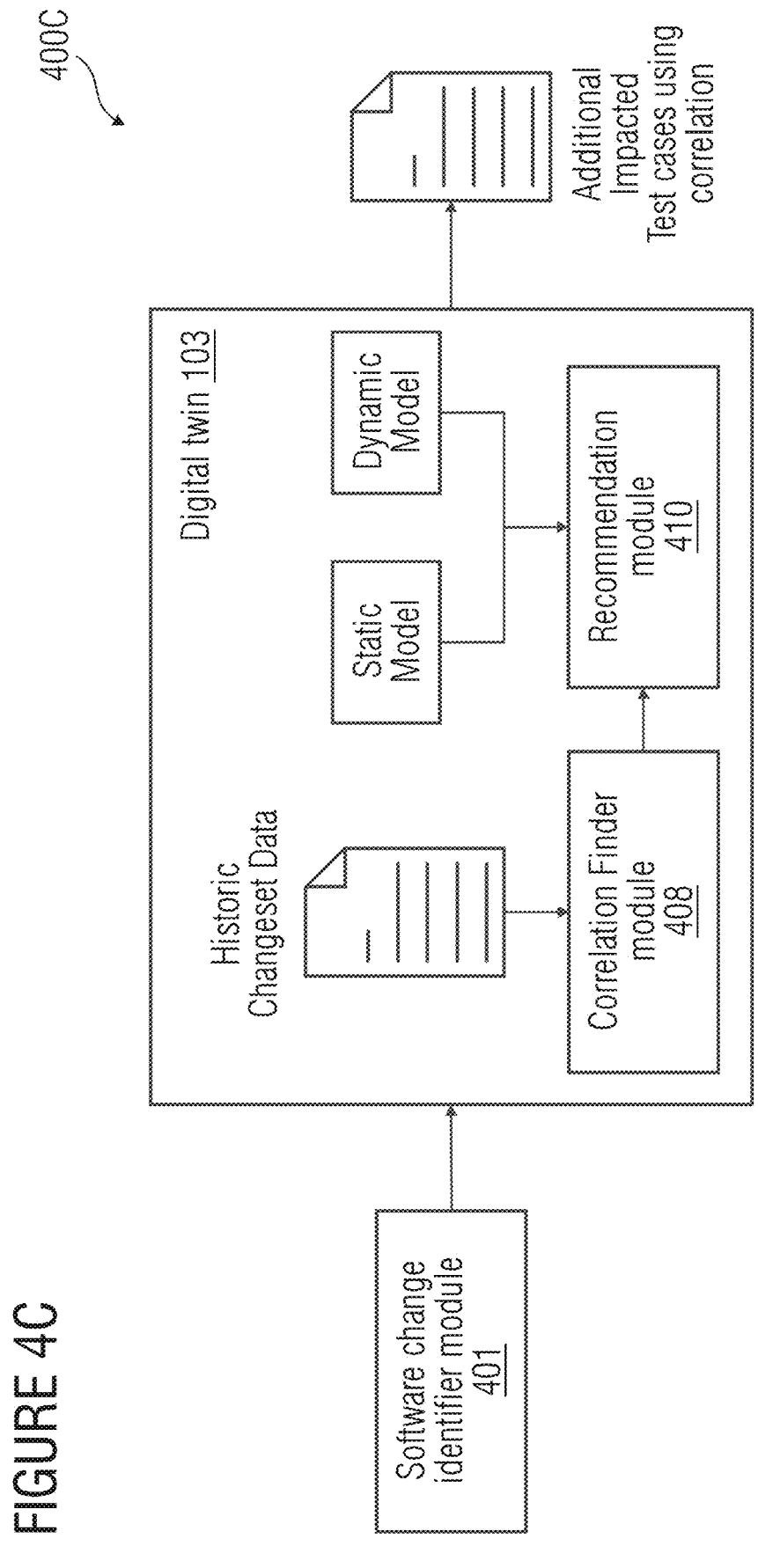
FIG. 4C-E illustrate different components of the digital twin, according to different embodiments.

Referring to FIG. 4A, illustrated is a flowchart of a method 400A for identification of additional workflows of the software program, according to an embodiment. At act 402, a correlation score is determined between the one or more determined workflows and other one or more workflows of the software program based on a similarity between the workflows. Herein, the one or more other workflows have been modified over a period of time. Notably, the other workflows are stored in the database 102 over a period of time. The database 102 acts as a historical database that stores all the historically determined workflows which are a result of modifications to the previous version of the software program. Similarity is determined between one or more workflows based on the functions or methods therein. Notably, the correlation score is a metric of similarity between the impacted workflows and other workflows stored in the database 102. The correlation score is calculated for each of the impacted workflows and other workflows. The method 400A is further explained in conjunction with FIG. 4C. Referring to FIG. 4C, illustrated is a component of the digital twin for identification of additional workflows of the software program, according to an embodiment. In an embodiment, the digital twin 103 includes a correlation finder module 408 to determine correlation between impacted workflows and other workflows stored in the database 102. The historic data pertaining to software code changes and the output of the software change identifier module 401 is input to the correlation finder module 408. The output of the correlation finder module 408 are one or more workflows with high correlation.

At act 403, the impacted workflows having the correlation score above a predefined threshold value are identified. The impacted workflows in a particular cluster having the correlation score above the predefined threshold value are identified as additional impacted workflows. In an embodiment, the recommendation module 410 recommends additional impacted testcases based on the correlation between the impacted workflows and the other plurality of workflows. In an embodiment, the digital twin 103 includes a recommendation module 410 configured to determine additional impacted workflows using correlation. The recommendation module 410 receives input from the correlation finder 408 and static model and dynamin model. Further, the recommendation module 410 analyses the software code and the output from the correlation finder 408 to recommend other methods or functions that may be closely impacted due to a change in certain method.

According to an embodiment, the method further includes determining a minimum number of workflows from the determined impacted workflows. The method is explained in greater detail in FIG. 4B. Referring to FIG. 4B, illustrated is a flowchart of a method 400B for determination of minimum workflows of the software program, according to an embodiment. Herein, the minimum number of workflows are required to validate the modification to the software code of the software program. Advantageously, the determination of minimum number of workflows provides that only a subset of workflows are executed for testing, thereby the disclosure is cost effective, energy efficient, and time efficient.

At act 404, one or more clusters are generated from the determined impacted workflows of the software program based on a similarity between each of the impacted workflows.

Figure 4D:
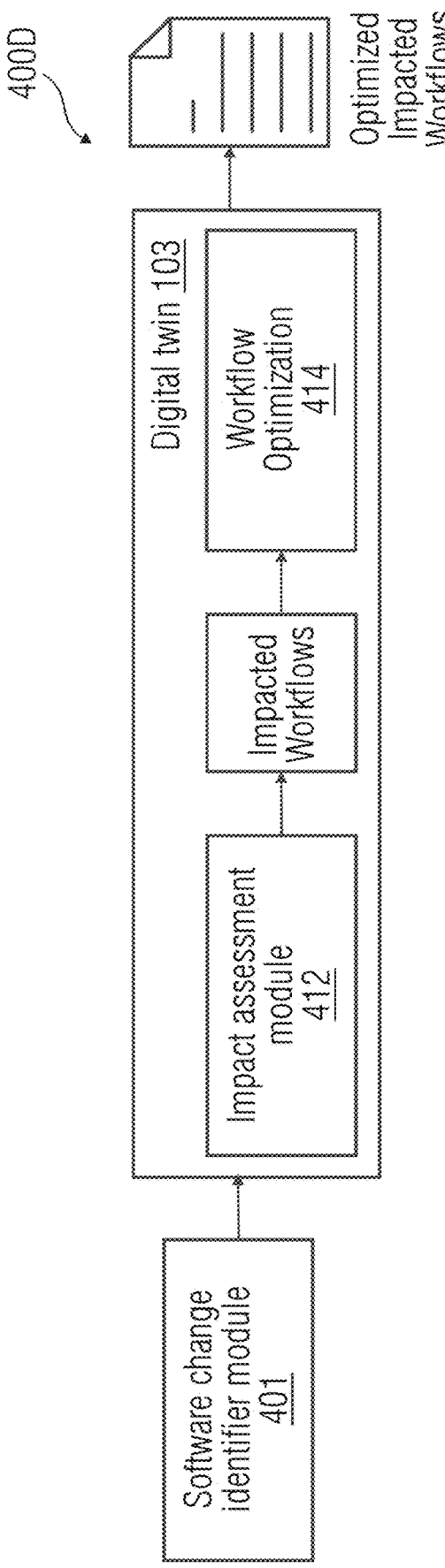

At act 405, a minimum number of workflows are determined from the impacted workflows based on the generated one or more clusters. In an embodiment, the digital twin 103 includes a workflow optimization module 414 to determine minimum number of workflows for testing the software code. FIG. 4D illustrates an exemplary block diagram for a component 400D for determining a minimum number of workflows from the determined impacted workflows, according to an embodiment. The determined impacted workflows may be received from the requirement mapper module (shown in FIG. 10B) and the recommendation module 410 and input to the workflow optimization module 414. The workflow optimization module 414 is configured to identify and compare all the impacted workflows and determine similarities and dissimilarities between each of the impacted workflows. Based on the analysis of similarities and dissimilarities between each of the impacted workflows, the workflow optimization module 414 is configured generate one or more clusters and select the minimum number of workflows that need to be executed to validate the change in the software code based on the generated clusters. It will be appreciated that the workflows that are dissimilar to each other are selected in order to determine minimum number of workflows.

Figure 4E:
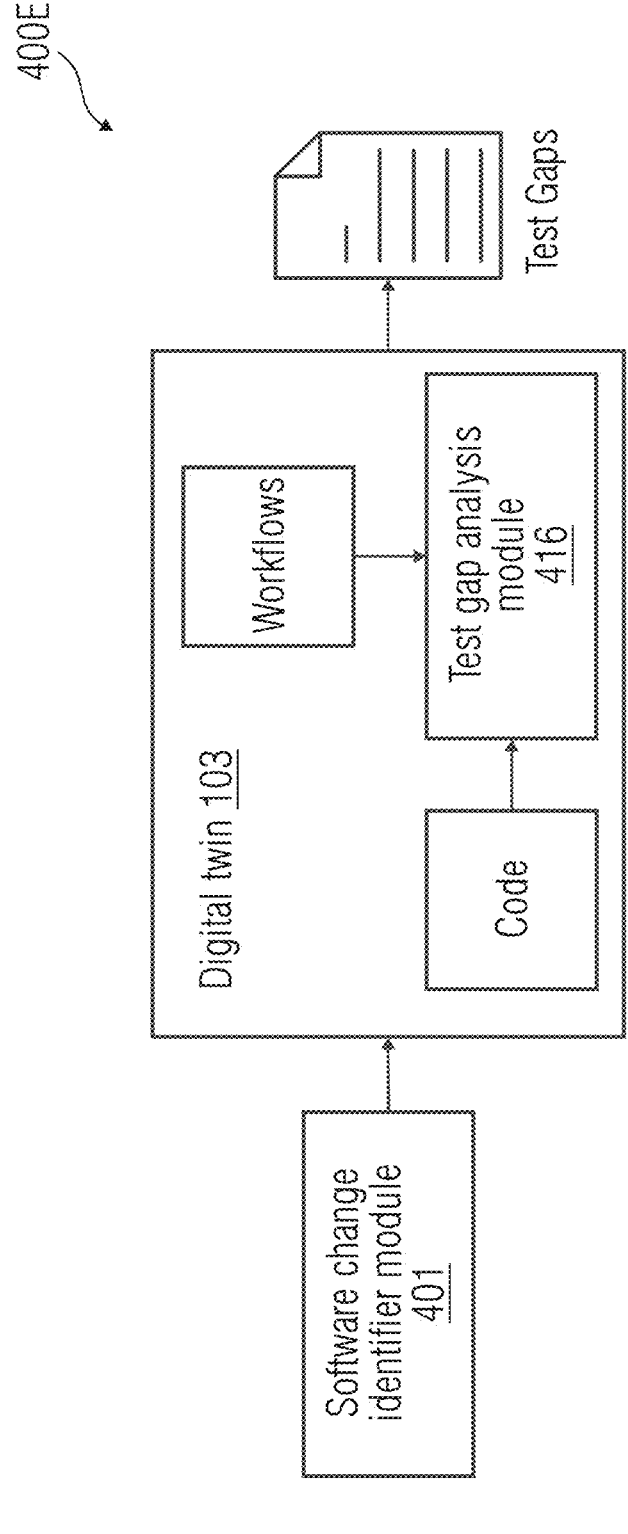

According to an embodiment, the method further includes the method further includes identifying one or more functions from the software code that have been modified. Herein the one or more functions includes none of the impacted workflows of the software program. Advantageously, test gap analysis is performed to determine the changes that have not been included in any of the determined impacted workflows. Therefore, such a method provides the quality of the software program of the device by avoiding any untested changes to go into production. In an embodiment, the digital twin 103 includes a test gap analysis module 416 configured to determine a list of functions or methods that have not been used in any workflows. FIG. 4E illustrates an exemplary block diagram for a component 400E for identifying one or more functions from the software code that have been modified, according to an embodiment. The input to the test gap analysis module 416 is the list of methods or functions determined by the software change identifier module 401. For each of the determined method or function, the test gap analysis module 416 identifies all impacted workflows. If for any of the method, there are no impacted workflows then a test gap has been identified for that method. The output of the test gap analysis module 416 is a list of methods or functions that are not used in any of the impacted workflows.

Referring back to FIG. 3, at act 312, the identified at least one impacted workflow critical to the functionality of the software program are executed for testing the functionality of the software program. The testing of the impacted workflows may be performed using a test suite module. The testing of the impacted workflows enables to determine a success rate of the modifications to the software code of the software program. In an embodiment, the critical workflows are executed for testing the functionality of the software program. In another embodiment, the impacted workflows are executed for testing the functionality of the software program. In yet another embodiment, the minimum number of impacted workflows are executed for testing the functionality of the software program. In yet another embodiment, the list of methods identified from the test gap analysis are executed for executed for testing the functionality of the software program.

Figure 5:
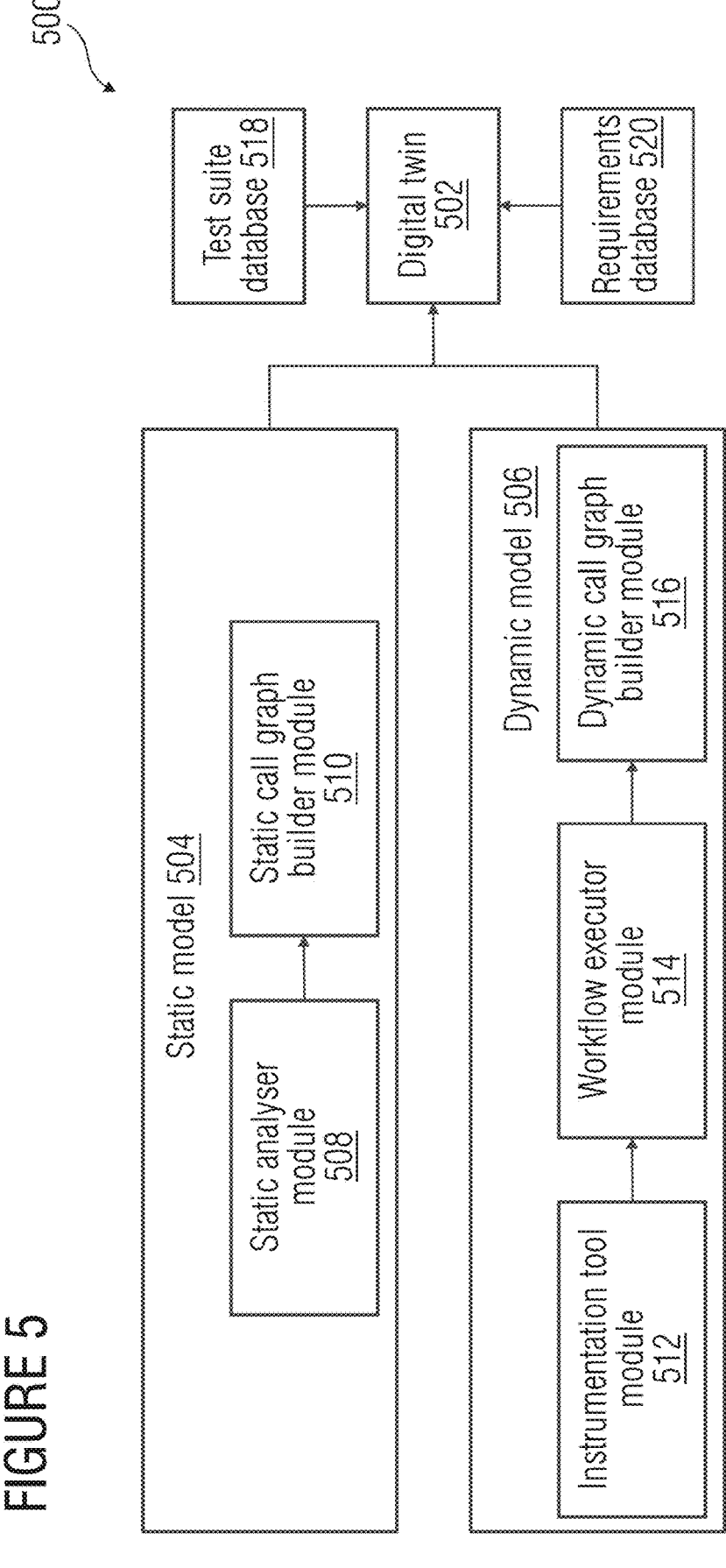
FIG. 5 illustrates an exemplary set-up for generating a digital twin based on static and dynamic models, according to an embodiment.

Referring to FIG. 5, illustrated is an exemplary set-up 500 for generating a digital twin based on static and dynamic models, according to an embodiment. The exemplary set-up includes a digital twin 502 (such as the digital twin 103), static model 504, dynamic model 506, static analyzer module 508, static call graph builder module 510, instrumentation tool module 512, workflow executor module 514, dynamic call graph builder module 516, test suite database 518, and requirements database 520.

The static analyzer module 508 retrieves the source code and one or more dependent libraries from the one or more sources. The static analyzer module 508 is configured to analyze the source code and dependent libraries to identify all the functions or methods and static links therebetween. Further, the static analyzer module 508 is configured to compute one or more metrics pertaining to the software code such as Lines of code, Cyclomatic Complexity, Nesting Depth, and the Page Rank, and so forth. The output of the static analyzer module 508 is the list of the methods or functions and static links between them.

The static call graph builder module 510 receives the information from the static analyzer module 508. The static call graph builder module 510 is configured to build a tree structure from the information about the list of the methods or functions and static links between them. Such a tree structure is referred to as a static call graph. The static call graph is stored in a database and includes the static model 504 of the software program.

The instrumentation tool module 512 is configured to monitor a dynamic behavior of the of the software program. For this purpose, the instrumentation tool module 512 is configured to instrument all the libraries and executables of the software program. The instrumentation tool module 512 is configured to add appropriate event records or logs in the instrumented libraries of the software program. This enables the instrumentation tool module 512 to monitor the dynamic behavior of the software program during run time.

The workflow executor module 514 is configured to derive one or more workflows based on the requirements of the software program. Further, the workflow executor module 514 is configured to execute the workflows in the software program and generate event records or logs for each of the workflows. The workflow executor module 514 records the behavior of the software program at run time using the generated event records. The workflow executor module 514 is also configured to maintain the links between each workflow and the logs generated during the execution of the workflow.

The dynamic call graph builder module 516 is configured to receive the information recorded by the workflow executor module 514. Further, the dynamic call graph builder module 516 is configured to process the logs from the workflow executor module 514 and extract information about the methods or functions and relationship between them during execution in real-time while maintaining a dynamic link with the workflow. Based on the extracted information, dynamic call graph builder module 516 is configured to construct a tree structure representing the methods, relationships, and dynamic links with the workflow. Such a tree structure is referred to as a dynamic call graph and includes the dynamic model of the software program.

The test suite database 518 includes one or more components for testing the functionality of the software program. In an embodiment, the test suite database 518 includes component test, Sub System Integration test (SSIT), System Integration Test (SITs), System Test (STs), of type automation and manual test cases of the software program.

The requirements database 520 includes description of features and functionalities of the target device 108. Advantageously, the requirements database 520 conveys the expectations of the users from the software program of the device 108.

The digital twin 502 includes of the static model 504 and dynamic model 506. The method includes comparing the static model with the dynamic model. The functions or methods which are appearing only in the dynamic model 506 are identified and added to the database 102. Further, the static model 504 and the dynamic model 506 are overlapped and the links which appear in both are identified. The overlapped static model 504 and the dynamic model 506 along with the requirements from the requirements database 520 and the test suite database 518 forms the digital twin 502. The digital twin 502 is a software twin that replicates the functioning of a software program.

Figure 6:
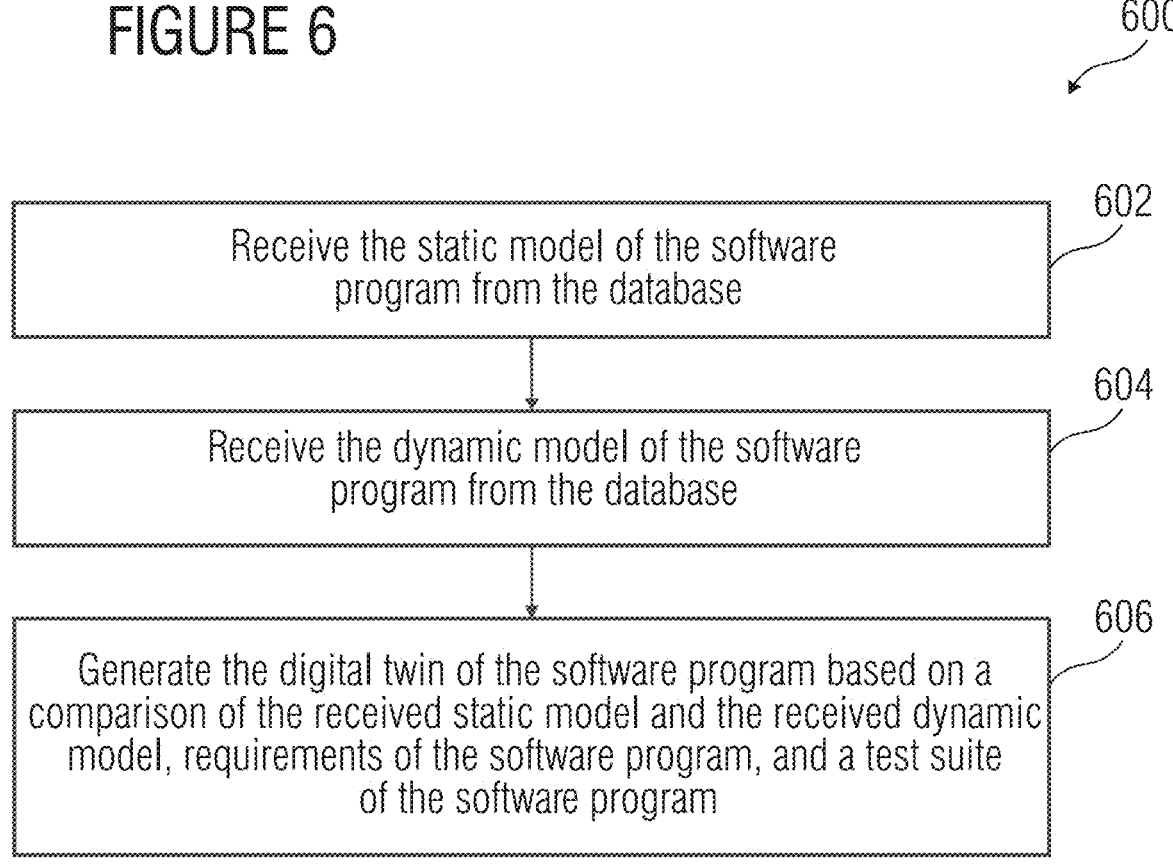
FIG. 6 illustrates a flowchart of a method for generating the digital twin, according to an embodiment.

Referring to FIG. 6, illustrated is a flowchart of a method 600 for generating the digital twin, according to an embodiment. At act 602, the static model 504 of the software program is received from the database 102. Herein, the static model 504 is generated based on the software code of the software program, libraries pertaining to the software code and static links therebetween as aforementioned.

At act 604, the dynamic model 506 of the software program is received from the database 102. Herein, the dynamic model 506 is generated based on execution of one or more workflows of the software code of the software program at run time as aforementioned.

At act 606, the digital twin 502 of the software program is generated based on a comparison of the received static model 504 and the received dynamic model 506, requirements of the software program, and a test suite of the software program.

Referring to FIG. 7, illustrated is a flowchart of a method 700 for generating the dynamic model of the software program, according to an embodiment. At act 702, one or more workflows of the software program are determined. Herein, the one or more workflows are derived based on at least one requirement of the software program.

At act 704, the one or more workflows of the software program are executed in real-time.

At act 706, one or more event records are generated based on the execution of the one or more workflows. Herein, each of the or more event records includes data associated with a behavior of the software program at run time.

At act 708, dynamic links are determined between each of the event records, data pertaining to the event records and corresponding one or more workflows.

At act 710, the dynamic model 506 of the software program based on the determined dynamic links.

Figure 8:
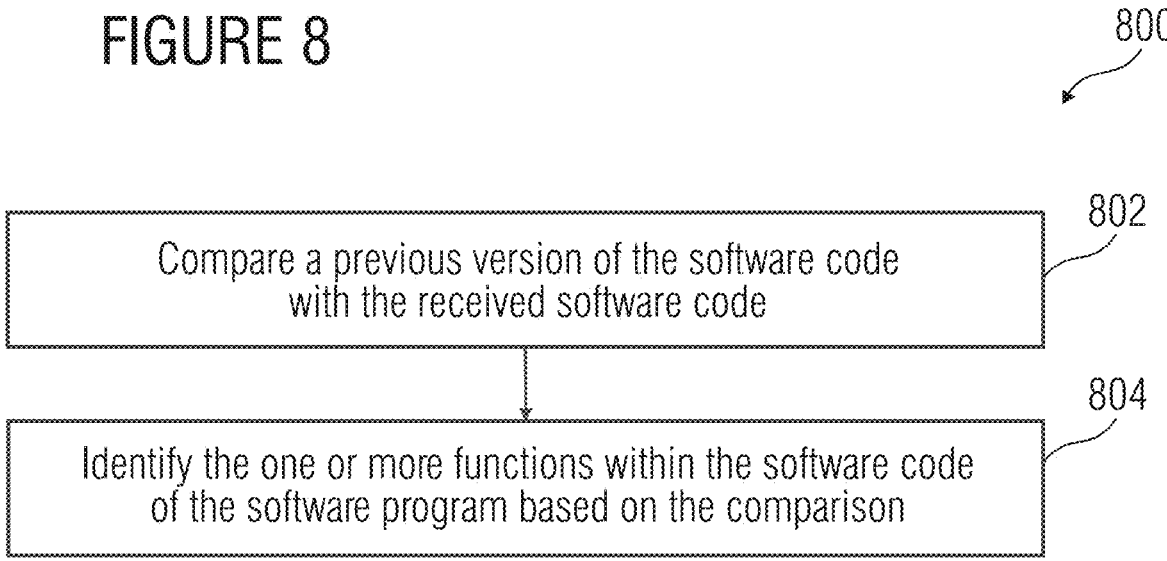
FIG. 8 illustrates a flowchart of a method for identifying one or more functions within the software code of the software program affected by the modification of the software code, according to an embodiment.

Referring to FIG. 8, illustrated is a flowchart of a method 800 for identifying one or more functions within the software code of the software program affected by the modification of the software code, according to an embodiment. At act 802, a previous version of the software code is compared with the received software code. Herein, the received software code is a current version of the software code.

At act 804, the one or more functions are identified within the software code of the software program based on the comparison. In an embodiment, the software change identifier module is configured to compare the previous version of the software code with the current version of the software code after the change. As a result, the software change identifier module is configured to determine a list of methods or functions that have been modified. The modification of the software code may include addition of a new function, a change to an existing function or a deletion of an existing function.

Figure 9B:
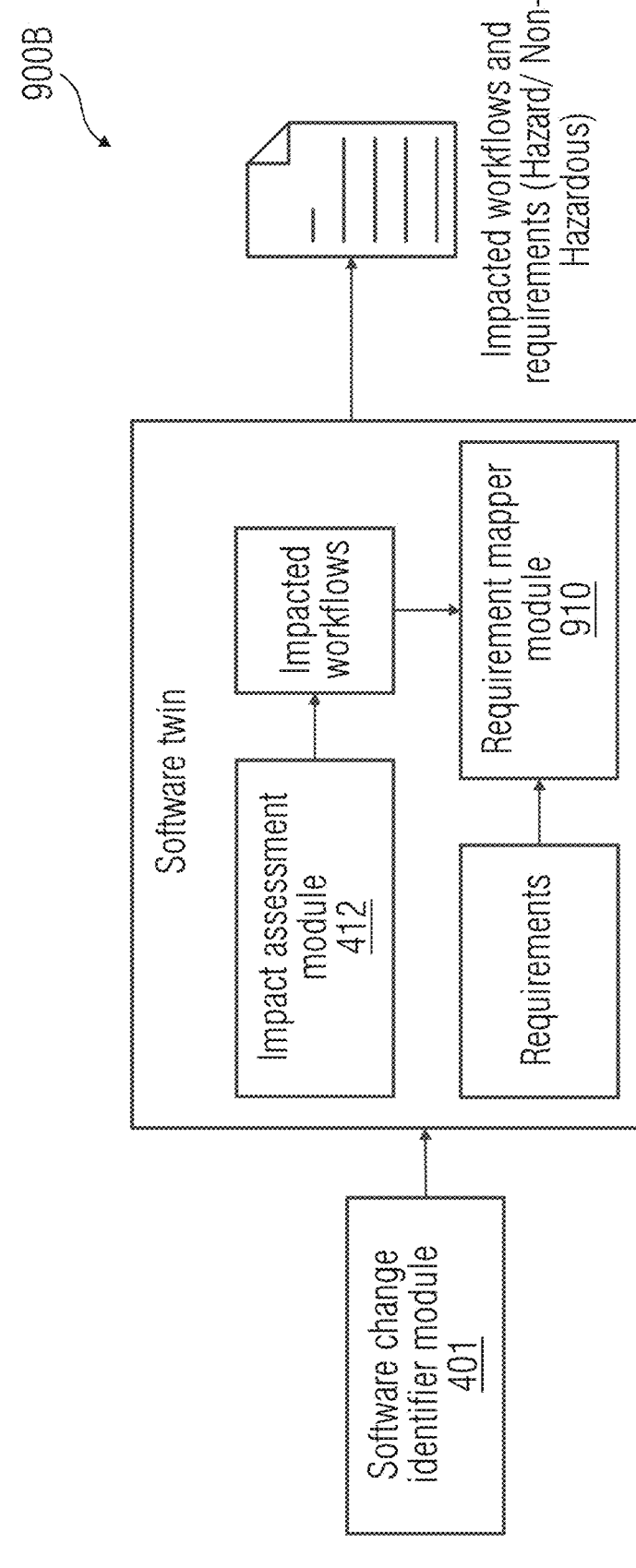
FIG. 9B illustrates is a component of digital twin for determining impacted workflows, according to an embodiment.

Referring to FIG. 9A, illustrated is a flowchart of a method 900A for determining one or more workflows of the software program based on the simulation of the digital twin, according to an embodiment. The method is further explained in conjunction with FIG. 9B. At act 902, analyzing the identified one or more functions of the software code using the digital twin 103. The analysis of the one or functions of the software code is performed based on the simulation results of the digital twin 103. In an embodiment, the impact assessment module 412 is configured to analyze the identified functions or methods as identified by the software change identifier module 401.

At act 904, a plurality of workflows are determined from the software code based on the analysis. Herein, the plurality of workflows include all the possible workflows of the software code.

At act 906, each of the plurality of workflows are mapped to the identified one or more functions of the software code.

At act 908, the one or more workflows that have been impacted by the modification of the source code are determined based on the mapping. In an embodiment, the impact assessment module 412 is configured to check all the possible workflows that pass through the method and lists out the impacted workflows.

FIG. 10 illustrates a flowchart of a method for identifying at least one impacted workflow from the one or more determined workflows based on one or more requirements of the software program, according to an embodiment. The method is further explained in conjunction with FIG. 9B. At act 1002, one or more requirements of the software program are retrieved from the database 102. In an embodiment, the requirements mapper module 910 is configured to receive impacted workflows from the impact assessment module 412. Further, the requirements mapper module 910 is configured to extract the requirements of the software program from a requirement engineering tool.

At act 1004, the requirements of software program are classified into one or more predefined groups. In an example, the predefined groups may be hazardous requirement and non-hazardous requirement. In an embodiment, the requirements mapper module 910 is configured to classify the extracted requirements as hazardous and non-hazardous.

At act 1006, each of the determined workflows are mapped to at least one of the predefined groups. Each of the determined workflows may be categorized as hazardous and non-hazardous based on the mapping. The requirements mapper module 910 is configured to analyze the impacted workflows and map the impacted workflows to their corresponding requirements. Further, the impacted workflows are tagged with same category as the classification of the corresponding requirement.

At act 1008, at least one impacted workflow is identified as critical from the one or more determined workflows based on the mapping. Notably, the impacted workflows that are mapped to hazardous requirements are hazardous workflows and considered critical to the functionality of the software program. Further, the impacted workflows that are mapped to non-hazardous requirements are non-hazardous workflows and considered non-critical to the functionality of the software program.

An advantage of the disclosure is that the functionality of the software program may be efficiently tested using a digital twin before the productization of the software program or release of the software program into the markets. The need for manually determining the optimal testcases is eliminated. Furthermore, the method makes use of both static behaviour and dynamic behaviour of the software program to assess the modification to the software code. Using dynamic analysis, the workflow is connected to part of the code not explicitly implied. Henceforth with any change in the software code, the impacted workflows are identified which would get missed normally. Additionally, the method enables effective prioritization of testcases or workflows for testing the functionality of the software program. The prioritization of workflows based on categorization as hazardous and non-hazardous workflow which is obtained by integrating software requirements provides that all the workflows that are critical to the software program are thoroughly tested. This results in better software quality. Furthermore, a need for execution of all the workflows/testcases is eliminated and the disclosure proposes the execution of only the minimum number of impacted workflows for a given change instead of running all the workflows which is less time consuming. Thereby, improving the total turnaround time. Moreover, because only a subset of the workflows needs to be executed, minimal resources are required to perform the execution of testcases, resulting in a cost-effective solution. Advantageously, the errors that may incur due to modification to the software code are also minimized as test gap analysis helps to identify the changes that have not been tested in a particular scenario and thus avoiding production or release of any untested modifications of the software code. This disclosure aims to improve the quality of a software program in a cost effective, time efficient, energy efficient, and resourceful manner.

The foregoing examples have been provided merely for the purpose of explanation and are in no way to be construed as limiting of the present disclosure herein. While the disclosure has been described with reference to various embodiments, it is understood that the words, which have been used herein, are words of description and illustration, rather than words of limitation. Further, although the disclosure has been described herein with reference to particular means, materials, and embodiments, the disclosure is not intended to be limited to the particulars disclosed herein; rather, the disclosure extends to all functionally equivalent structures, methods and uses, such as are within the scope of the appended claims. Those skilled in the art, having the benefit of the teachings of this specification, may affect numerous modifications thereto and changes may be made without departing from the scope and spirit of the disclosure in its aspects.

What is claimed is:

1. A method for testing a functionality of a software program based on at least one modification to a software code of the software program, the method comprising:

receiving, by a processing unit, the software code of the software program from one or more sources for testing, wherein the software code of the software program has been modified;

identifying, by the processing unit, one or more functions within the software code of the software program affected by the modification of the software code of the software program;

simulating, by the processing unit, the identified one or more functions within the software code of the software program using a digital twin of the software program, wherein the digital twin of the software program is generated based on a static model of the software program and a dynamic model of the software program stored in a database;

determining, by the processing unit, one or more workflows of the software code of the software program based on the simulation of the identified one or more functions within the software code of the software program using the digital twin of the software program, wherein the determined one or more workflows of the software code of the software program are impacted by the identified one or more functions within the software code of the software program;

identifying, by the processing unit, at least one impacted workflow of the software code of the software program from the determined one or more workflows of the software code of the software program based on one or more requirements of the software program, wherein the identified at least one impacted workflow of the software code of the software program is critical to the functionality of the software program; and executing, by the processing unit, the identified at least one impacted workflow of the software code of the software program critical to the functionality of the software program for testing the functionality of the software program.

2. The method of claim 1, further comprising:

determining, by the processing unit, a correlation score between the identified at least one impacted workflow of the software code of the software program and other one or more workflows of the software code of the software program based on a similarity between the one or more workflows of the software code of the software program, wherein the other one or more workflows of the software code of the software program have been modified over a period of time and are stored in the database or a different database; and identifying, by the processing unit, one or more impacted workflows of the software code of the software program having the correlation score above a predefined threshold value.

3. The method of claim 1, further comprising:

generating, by the processing unit, one or more clusters from the identified at least one impacted workflow of the software code of the software program based on a similarity between each impacted workflow of the impacted workflows of the software code of the software program; and determining, by the processing unit, a minimum number of workflows from the impacted workflows of the software code of the software program based on the generated one or more clusters, wherein the minimum number of workflows are required to validate the modification to the software code of the software program.

4. The method of claim 1, further comprising:

identifying, by the processing unit, at least one function within the software code of the software program that has been modified, wherein the at least one function within the software code of the software program comprises none of the identified at least one impacted workflow of the software code of the software program.

5. The method of claim 1, wherein the identifying of the one or more functions within the software code of the software program comprises:

comparing, by the processing unit, a previous version of the software code of the software program with the received software code of the software program, wherein the received software code of the software program is a current version of the software code of the software program; and identifying, by the processing unit, the one or more functions within the software code of the software program based on the comparing.

6. The method of claim 1, wherein the determining of the one or more workflows of the software code of the software program comprises:

analyzing, by the processing unit, the identified one or more functions within the software code of the software program using the digital twin of the software program;

determining, by the processing unit, a plurality of workflows within the software code of the software program based on the analyzing, wherein the plurality of workflows comprise all possible workflows of the software code of the software program;

mapping, by the processing unit, each workflow of the plurality of workflows to the identified one or more functions within the software code of the software program; and determining, by the processing unit, the one or more workflows of the software code of the software program that have been impacted by the modification of the software code of the software program based on the mapping.

7. The method of claim 1, wherein the identifying of the at least one impacted workflow of the software code of the software program comprises:

retrieving, by the processing unit, one or more requirements of the software program from the database;

classifying, by the processing unit, the one or more requirements of the software program into one or more predefined groups;

mapping, by the processing unit, each of the determined one or more workflows of the software code of the software program to at least one predefined group of the one or more predefined groups; and identifying, by the processing unit, the at least one impacted workflow of the software code of the software program from the determined one or more workflows of the software code of the software program as a critical workflow based on the mapping.

8. The method of claim 1, wherein the generating of the digital twin of the software program comprises:

receiving, by the processing unit, the static model of the software program from the database, wherein the static model of the software program is generated based on the software code of the software program, libraries pertaining to the software code of the software program, and static links therebetween;

receiving, by the processing unit, the dynamic model of the software program from the database, wherein the dynamic model of the software program is generated based on execution of one or more workflows of the software code of the software program at run time; and generating, by the processing unit, the digital twin of the software program based on a comparison of the received static model of the software program and the received dynamic model of the software program, requirements of the software program, and a test suite of the software program.

9. The method of claim 8, wherein the generating of the dynamic model of the software program comprises:

determining, by the processing unit, at least one workflow of the software code of the software program, wherein the at least one workflow of the software code of the software program is derived based on at least one requirement of the software program;

executing, by the processing unit, the one or more workflows of the software code of the software program in real-time;

generating, by the processing unit, one or more event records based on the execution of the one or more workflows of the software code of the software program, wherein each event record of the one or more event records comprises data associated with a behavior of the software program at run time;

determining, by the processing unit, dynamic links between each event record of the one or more event records, data pertaining to the one or more event records, and corresponding one or more workflows of the software code of the software program; and generating, by the processing unit, the dynamic model of the software program based on the determined dynamic links.

10. A device for testing a functionality of a software program based on at least one modification to a software code of the software program, the device comprising:

one or more processing units; and a memory coupled to the one or more processing units, the memory storing a functionality testing module configured to:

receive the software code of the software program from one or more sources for testing, wherein the software code of the software program has been modified;

identify one or more functions within the software code of the software program affected by the modification of the software code of the software program;

simulate the identified one or more functions within the software code of the software program using a digital twin of the software program, wherein the digital twin of the software program is generated based on a static model of the software program and a dynamic model of the software program stored in a database;

determine one or more workflows of the software code of the software program based on the simulation of the identified one or more functions within the software code of the software program using the digital twin of the software program, wherein the determined one or more workflows of the software code of the software program are impacted by the identified one or more functions within the software code of the software program;

identify at least one impacted workflow of the software code of the software program from the determined one or more workflows of the software code of the software program based on one or more requirements of the software program, wherein the identified at least one impacted workflow of the software code of the software program is critical to the functionality of the software program; and execute the identified at least one impacted workflow of the software code of the software program critical to the functionality of the software program for testing the functionality of the software program.

11. The device of claim 10, wherein the functionality testing module is further configured to:

determine a correlation score between the identified at least one impacted workflow of the software code of the software program and other one or more workflows of the software code of the software program based on a similarity between the one or more workflows of the software code of the software program, wherein the other one or more workflows of the software code of the software program have been modified over a period of time and are stored in the database or a different database; and identify one or more impacted workflows of the software code of the software program having the correlation score above a predefined threshold value.

12. The device of claim 10, wherein, in the determining of the one or more workflows of the software code of the software program, the functionality testing module is further configured to:

analyze the identified one or more functions within the software code of the software program using the digital twin of the software program;

determine a plurality of workflows within the software code of the software program based on the analyzing, wherein the plurality of workflows comprise all possible workflows of the software code of the software program;

map each workflow of the plurality of workflows to the identified one or more functions within the software code of the software program; and determine the one or more workflows of the software code of the software program that have been impacted by the modification of the software code of the software program based on the mapping.

13. The device of claim 10, wherein, in the identifying of the at least one impacted workflow of the software code of the software program, a workflow determination module of the memory is configured to:

retrieve one or more requirements of the software program from the database;

classify the one or more requirements of the software program into one or more predefined groups;

map each of the determined one or more workflows of the software code of the software program to at least one predefined group of the one or more predefined groups; and identify the at least one impacted workflow of the software code of the software program from the determined one or more workflows of the software code of the software program as a critical workflow based on the mapping.

14. The device of claim 10, wherein, in the generating of the digital twin of the software program, a workflow determination module of the memory is configured to:

receive the static model of the software program from the database, wherein the static model of the software program is generated based on the software code of the software program, libraries pertaining to the software code of the software program, and static links therebetween;

receive the dynamic model of the software program from the database, wherein the dynamic model of the software program is generated based on execution of one or more workflows of the software code of the software program at run time; and generate the digital twin of the software program based on a comparison of the received static model of the software program and the received dynamic model of the software program, requirements of the software program, and a test suite of the software program.

15. The device of claim 10, wherein, in the generating of the dynamic model of the software program, a workflow determination module of the memory is configured to:

determine at least one workflow of the software code of the software program, wherein the at least one workflow of the software code of the software program is derived based on at least one requirement of the software program;

execute the one or more workflows of the software code of the software program in real-time;

generate one or more event records based on the execution of the one or more workflows of the software code of the software program, wherein each event record of the one or more event records comprises data associated with a behavior of the software program at run time;

determine dynamic links between each event record of the one or more event records, data pertaining to the one or more event records, and corresponding one or more workflows of the software code of the software program; and generate the dynamic model of the software program based on the determined dynamic links.

16. A system for testing a functionality of a software program based on at least one modification to a software code of the software program, the system comprising:

one or more servers; and a device comprising one or more processing units and a memory, communicatively coupled to the one or more servers, the one or more servers storing one or more instructions, which, when executed, cause the one or more servers to:

receive the software code of the software program from one or more sources for testing, wherein the software code of the software program has been modified;

identify one or more functions within the software code of the software program affected by the modification of the software code of the software program;

simulate the identified one or more functions within the software code of the software program using a digital twin of the software program, wherein the digital twin of the software program is generated based on a static model of the software program and a dynamic model of the software program stored in a database;

determine one or more workflows of the software code of the software program based on the simulation of the identified one or more functions within the software code of the software program using the digital twin of the software program, wherein the determined one or more workflows of the software code of the software program are impacted by the identified one or more functions within the software code of the software program;

identify at least one impacted workflow of the software code of the software program from the determined one or more workflows of the software code of the software program based on one or more requirements of the software program, wherein the identified at least one impacted workflow of the software code of the software program is critical to the functionality of the software program; and execute the identified at least one impacted workflow of the software code of the software program critical to the functionality of the software program for testing the functionality of the software program.

*   *   *   *   *